US012381620B2

(12) United States Patent
Wang et al.

(10) Patent No.: US 12,381,620 B2
(45) Date of Patent: Aug. 5, 2025

(54) RELAY SELECTION METHOD FOR UNMANNED AERIAL VEHICLES IN POST DISASTER EMERGENCY SCENARIOS IN UNDERGROUND SPACE

(71) Applicant: China University of Mining and Technology, Xuzhou (CN)

(72) Inventors: Bowen Wang, Xuzhou (CN); Yanjing Sun, Xuzhou (CN); Song Li, Xuzhou (CN); Xiao Yun, Xuzhou (CN); Ruirui Chen, Xuzhou (CN); Yonggang Xu, Xuzhou (CN)

(73) Assignee: China University of Mining and Technology, Xuzhou (CN)

( * ) Notice: Subject to any disclaimer, the term of this patent is extended or adjusted under 35 U.S.C. 154(b) by 399 days.

(21) Appl. No.: 18/113,258

(22) Filed: Feb. 23, 2023

(65) Prior Publication Data

US 2023/0224021 A1    Jul. 13, 2023

Related U.S. Application Data

(63) Continuation of application No. PCT/CN2022/104900, filed on Jul. 11, 2022.

(30) Foreign Application Priority Data

Nov. 18, 2021   (CN) .......................... 202111371557.2

(51) Int. Cl.
*H04B 7/185*     (2006.01)
*H04W 4/90*      (2018.01)
(52) U.S. Cl.
CPC .......... *H04B 7/18504* (2013.01); *H04W 4/90* (2018.02)

(58) Field of Classification Search
CPC ..... H04B 7/185; H04B 7/19804; H04W 4/90; H04L 12/24
See application file for complete search history.

(56) References Cited

U.S. PATENT DOCUMENTS

| 7,864,752 B1 * | 1/2011 | Bennett ................ H04W 76/12 |
| | | 370/352 |
| 9,713,180 B1 * | 7/2017 | Gupta ............... H04W 52/0209 |

(Continued)

FOREIGN PATENT DOCUMENTS

| CN | 110417847 A | 11/2019 |
| CN | 110736478 A | 1/2020 |

(Continued)

*Primary Examiner* — Hai V Nguyen
(74) *Attorney, Agent, or Firm* — Stuart H. Mayer; Kaplan Breyer Schwarz, LLP

(57) ABSTRACT

Disclosed is a relay selection method for unmanned aerial vehicles in post disaster emergency scenarios in underground space, comprising the following steps: collecting a maximum rate, a minimum rate and an average rate of data transmission assisted by a D2D user through an unmanned aerial vehicle (UAV) based on a prediction range of the D2D user for the UAV, and obtaining a first uncertain preference order of the D2D user for the UAV and a second uncertain preference order of the UAV for the D2D user; obtaining a preference strategy of the D2D user for the UAV based on the first uncertain preference order and the second uncertain preference order; and exchanging and matching the UAVs matched by any two D2D users based on the many-to-one bilateral matching model, so as to obtain a stable matching result of bilateral exchange.

10 Claims, 5 Drawing Sheets

(56) References Cited

U.S. PATENT DOCUMENTS

| | | | |
|---|---|---|---|
| 10,225,844 B2* | 3/2019 | Kim | H04W 72/542 |
| 10,742,468 B2* | 8/2020 | Kim | H04L 27/2646 |
| 11,003,184 B2* | 5/2021 | Magalhães de Matos | H04W 4/40 |
| 11,873,005 B2* | 1/2024 | Altman | G01C 21/3889 |
| 12,075,378 B2* | 8/2024 | Song | H04W 56/0045 |
| 2019/0171208 A1* | 6/2019 | Magalhães de Matos | G06N 20/00 |
| 2019/0215214 A1* | 7/2019 | Kim | H04W 84/06 |
| 2020/0288390 A1* | 9/2020 | Wang | H04W 36/00835 |
| 2021/0114616 A1* | 4/2021 | Altman | H04W 76/15 |
| 2021/0352643 A1* | 11/2021 | Ahn | H04W 72/044 |
| 2022/0014226 A1* | 1/2022 | Kim | H01P 5/19 |
| 2022/0095278 A1* | 3/2022 | Kim | H04W 72/51 |
| 2022/0116850 A1* | 4/2022 | Ahn | H04W 88/04 |
| 2022/0400386 A1* | 12/2022 | Furuichi | H04W 56/001 |
| 2023/0075285 A1* | 3/2023 | Jung | H04W 48/18 |
| 2023/0254692 A1* | 8/2023 | Kim | H04W 12/61 726/6 |
| 2023/0268981 A1* | 8/2023 | Park | H04L 5/0051 370/316 |
| 2023/0269032 A1* | 8/2023 | Park | H04B 7/06 |
| 2023/0275729 A1* | 8/2023 | Keum | H04L 27/2657 370/329 |
| 2023/0344505 A1* | 10/2023 | Kim | H04W 56/0015 |
| 2023/0354282 A1* | 11/2023 | Kim | H04W 48/10 |
| 2023/0403737 A1* | 12/2023 | Mohammad Soleymani | H04W 76/14 |
| 2024/0064330 A1* | 2/2024 | Drugeon | H04N 19/157 |
| 2024/0112312 A1* | 4/2024 | Phillips | G06F 3/016 |
| 2024/0128999 A1* | 4/2024 | Haustein | H04B 7/04013 |
| 2024/0188178 A1* | 6/2024 | Fehrenbach | H04W 52/0216 |
| 2025/0048404 A1* | 2/2025 | Cho | H04N 23/61 |

FOREIGN PATENT DOCUMENTS

| | | | | |
|---|---|---|---|---|
| CN | 111615200 A | | 9/2020 | |
| CN | 112737837 A | | 4/2021 | |
| CN | 114071432 A | | 2/2022 | |
| JP | 2024155574 A | * | 10/2024 | H04B 7/06954 |
| WO | WO-2022142276 A1 | * | 7/2022 | H04B 7/18506 |

* cited by examiner

RELAY SELECTION METHOD FOR UNMANNED AERIAL VEHICLES IN POST DISASTER EMERGENCY SCENARIOS IN UNDERGROUND SPACE

CROSS-REFERENCE TO RELATED APPLICATIONS

This application is a continuation of PCT/CN2022/104900, filed on Jul. 11, 2022 and claims priority of Chinese Patent Application No. 202111371557.2, filed on Nov. 18, 2021, the entire contents of which are incorporated herein by reference.

TECHNICAL FIELD

The application relates to the technical field of unmanned aerial vehicle relay matching, and in particular to a relay selection method for unmanned aerial vehicles in post disaster emergency scenarios in underground space.

BACKGROUND

With rapid economic development and accelerated intelligent infrastructure construction, the development scale of underground space, including mines, tunnels, subways, civil air defense works and underground parking lots, is constantly expanding, and therefore brings severe challenges to safety. Once a disaster occurs in the underground space, the basic sensing communication facilities are partially or completely destroyed, and the trapped people and rescuers cannot transmit information in real time, which makes it difficult to carry out rescue operations effectively, and easily leads to casualties and economic losses. Therefore, a flexible emergency communication network is needed, which may quickly realize the breakpoint transmission. With the characteristics of strong mobility, high flexibility, easy operation and strong reconfiguration, unmanned aerial vehicles (UAV) may provide omni-directional, three-dimensional and blind area-free disaster monitoring and communication coverage for disaster-prone areas such as underground space through space-based network resources such as UAV, which may quickly ensure the normal communication of users in disaster areas with damaged communication infrastructure and more efficiently complete emergency communication tasks. Therefore, it is necessary to consider UAV relay in emergency communication scenarios to improve emergency communication support capability.

As a mathematical tool to analyze users' mutual benefits, matching theory is widely used in designing distributed wireless resource allocation and relay selection algorithms. In the post-disaster emergency communication scenario, in order to ensure the timely and effective communication of as many rescuers as possible, and multiple D2D pairs can reuse the same relay UAV, so the one-to-one matching method is not applicable. However, in many-to-one matching, the D2D pairs that choose the same relay UAV are often not independent, and their decisions are often influenced by the decisions of other D2D pairs, so they cannot get a stable matching result, which leads to the problem of the peer effect. Generally the influence of peer effect is eliminated by exchange matching, but some existing methods are centralized and are not suitable for dynamic distributed scenarios. Moreover, accurate information such as the connection weight between bilateral subjects is necessary in the matching process, but in reality, uncertain information is easy to appear due to the fuzziness and complexity of the decision-making environment, and it is easier to obtain inaccurate sequence interval preference information, that is, preference sequence, of individuals on the other side when matching bilateral subjects. In the post-disaster environment, the dynamic mobility of UAV and D2D users may lead to their inability to obtain an accurate preference list, and thus the effective matching between D2D users and relay UAVs cannot be achieved.

SUMMARY

Aiming at the above problems, the objective of the present application is to provide an efficient bilateral stable matching relay selection method for post-disaster unmanned aerial vehicles (UAV) with an uncertain preference order. Firstly, the uncertain preference order of D2D users and relay UAVs is generated, and then the matching between D2D users and relay UAVs is completed by using a many-to-one bilateral matching theory. Then the stable matching result is further obtained through exchange matching according to the existence of the peer effect in the cluster of D2D users multiplexing the same UAV relay.

In order to achieve the above objective, the application provides a relay selection method for unmanned aerial vehicles in post disaster emergency scenarios in underground space, including the following steps:

collecting a maximum rate, a minimum rate and an average rate of data transmission assisted by a D2D user through an unmanned aerial vehicle (UAV) based on a prediction range of the D2D user for the UAV, and obtaining a first uncertain preference order of the D2D user for the UAV and a second uncertain preference order of the UAV for the D2D user;

obtaining a preference strategy of the D2D user for the UAV based on the first uncertain preference order and the second uncertain preference order, and constructing a many-to-one bilateral matching model according to a many-to-one bilateral matching algorithm;

exchanging and matching the UAVs matched by any two D2D users based on the many-to-one bilateral matching model, so as to obtain a stable matching result of bilateral exchange.

Optionally, in a process of obtaining the first uncertain preference order and the second uncertain preference order, a prediction range of the D2D user for the UAV in a target time slot is obtained by selecting the target time slot.

Optionally, in a process of obtaining the first uncertain preference order, the first uncertain preference order is constructed according to the maximum rate and the minimum rate, and a first preference expression of the first uncertain preference order is obtained, where the first preference expression is:

$$H_{km} = (M - r_{km}^U) \sum_{i=r_{km}^L}^{r_{km}^U} \frac{1}{i \Box |Y_{ki}|} \Box \frac{1}{Z(U_m)} - \sum_{i=1}^{r_{km}^L - 1} \frac{1}{i \Box |Y_{ki}|},$$

where $r_{mk}^U$ is a lower limit of the first uncertain preference order, $r_{km}^L$ is an upper limit of the first uncertain preference order; for the UAV $U_m$, $Y_{mj}$ is the set of individuals arranged in the jth place of the set K of D2D pairs; $|Y_{ki}|$ is the number of individuals in the set, and $Z(k)$ is a first interval length of the second uncertain preference order.

Optionally, in the process of obtaining the second uncertain preference order, the second uncertain preference order is constructed according to the maximum rate and the minimum rate, and a second preference expression of the second uncertain preference order is obtained; the preference expression is as follows:

$$H_{mk} = (K - r_{mk}^U) \sum_{j=r_{mk}^L}^{r_{mk}^U} \frac{1}{j \Box |Y_{mj}|} \Box \frac{1}{Z(k)} - \sum_{j=1}^{r_{mk}^L - 1} \frac{1}{j \Box |Y_{mj}|},$$

where $r_{mk}^U$ is a lower limit of the second uncertain preference order, $r_{km}^L$ is an upper limit of the second uncertain preference order; for UAV $U_m$, $Y_{mj}$ is the set of individuals arranged in the jth place of the set K of D2D pairs; $|Y_{ki}|$ is the number of individuals in the set, and $Z(k)$ is a second interval length of the first uncertain preference order.

Optionally, obtaining the preference strategy and a preference list corresponding to the preference strategy according to the first preference expression and the second preference expression, and constructing the many-to-one bilateral matching model, where constraint conditions of the many-to-one bilateral matching model are as follows:

$\omega: K \cup U \to K \cup U \cup \emptyset,$ where $\forall k \in K, \omega(k) \subseteq U \cup \emptyset, |\omega(k)| \leq 1;$ $\forall U_m \in U, \omega(U_m) \subseteq K \cup \emptyset, |\omega(U_m)| \leq q_0;$ $\forall k \in K, \forall U_m \in U, \omega(k) = U_m \Leftrightarrow \omega(U_m) = k.$ Optionally, in the process of constructing a many-to-one bilateral matching model, the matching process of the many-to-one bilateral matching model includes the following steps:

the D2D user calculates transmission performances by predicting a position of the relay UAV to obtain the first uncertain preference order, generates a corresponding preference list according to the first preference expression, and sorts and selects the relay UAV according to the preference list;

the relay UAV accepts a matching request of a best candidate according to the constraint condition after receiving the request of the D2D user, and rejects other D2D users;

the accepted D2D user stops the matching process, and the rejected D2D user sends a matching request to a suboptimal relay UAV until there is no better relay link than a current matching item, and the matching process is terminated.

Optionally, after the matching process is terminated, an exchange matching process includes the following steps:

S1, selecting a first D2D pair and a second D2D pair of the D2D user, and a first matching object of the first D2D pair and a second matching object of the second D2D pair;

S2, matching the first D2D pair with the second matching object, and simultaneously matching the second D2D pair with the first matching object; and S3, judging whether to execute an operation of the S2 according to the matching result of the S2, where the judging process includes:

when a transmission rate of the first D2D pair is increased and a transmission rate of the second D2D pair is unchanged, the matching process of the S2 is maintained;

when the transmission rate of the second D2D pair is increased and the transmission rate of the first D2D pair is unchanged, the matching process of the S2 is maintained;

when the transmission rate of the first D2D pair and the transmission rate of the second D2D pair are all increased, the matching process of the S2 is maintained;

otherwise, the matching process of S2 will not be executed.

Optionally, the constraint condition of the exchange matching is that when the first D2D pair and the second D2D pair meet following two conditions at the same time, an exchange restriction pair is formed, and the exchange matching process is executed:

$\forall u \in \{k, k', \omega(k), \omega(k')\}, R_{avg}^k(\omega_k^{k'}) \geq R_{avg}^k(\omega)$     condition 1:

$\exists u \in \{k, k', \omega(k), \omega(k')\}, R_{avg}^k(\omega_k^{k'}) \geq R_{avg}^k(\omega).$     condition 2:

Optionally, the steps of the exchange matching process include:

S1, initializing the number of times that D2D pair k sends exchange requests to D2D pair k' in the initial stage, that is, $C_{kk'}=0$;

S2, each of the D2D pairs $k \in K$ searches another D2D pair $k' \in \{K \backslash k\}$ to form an exchange restriction pair, and if $(k,k')$ forms the exchange restriction pair and satisfies $C_{kk'} + C_{k'k} \leq 2$, the matching result is updated according to the many-to-one matching algorithm based on the uncertain preference order, and $C_{kk'} = C_{kk'} + 1$; otherwise, the current matching state is maintained;

S3, when there is no exchange restriction pair in the current matching, returning an updated matching result.

Optionally, a UAV relay selection system for realizing a UAV relay selection method includes:

a data acquisition and processing module is used to collect the maximum rate, minimum rate and average rate of the data transmission assisted by the D2D user through the UAV based on the prediction range of the D2D user for the UAV, and obtain the first uncertain preference order of the D2D user for the UAV and the second uncertain preference order of the UAV for the D2D user;

a preference matching module is used to obtain the preference strategy of the D2D user for the UAV based on the first uncertain preference order and the second uncertain preference order, and construct the many-to-one bilateral matching model according to the many-to-one bilateral matching algorithm; and an exchange matching module is used to exchange and match the matched UAVs of any two D2D users based on the matching result of the preference matching module, and obtain the stable matching result of bilateral exchange.

Compared with the prior art, the computational complexity of the algorithm of the application is greatly reduced compared with the exhaustive algorithm; in addition, the application allows the same relay UAV to cooperate with multiple pairs of D2D users to communicate in the same time slot, and the matching result is stable, which may guarantee the timely and effective communication of as many rescuers as possible; the algorithm of the application has better performance than other methods, and is more suitable for emergency dynamic distributed scenes.

BRIEF DESCRIPTION OF THE DRAWINGS

In order to more clearly explain the embodiments of the present application or the technical solutions in the prior art, the following will briefly introduce the drawings to be used in the embodiments. Obviously, the drawings in the following description are only some embodiments of the present application. For those of ordinary skill in the art, other drawings may be obtained according to these drawings without any creative labor.

DETAILED DESCRIPTION OF THE EMBODIMENTS

Figure 1:
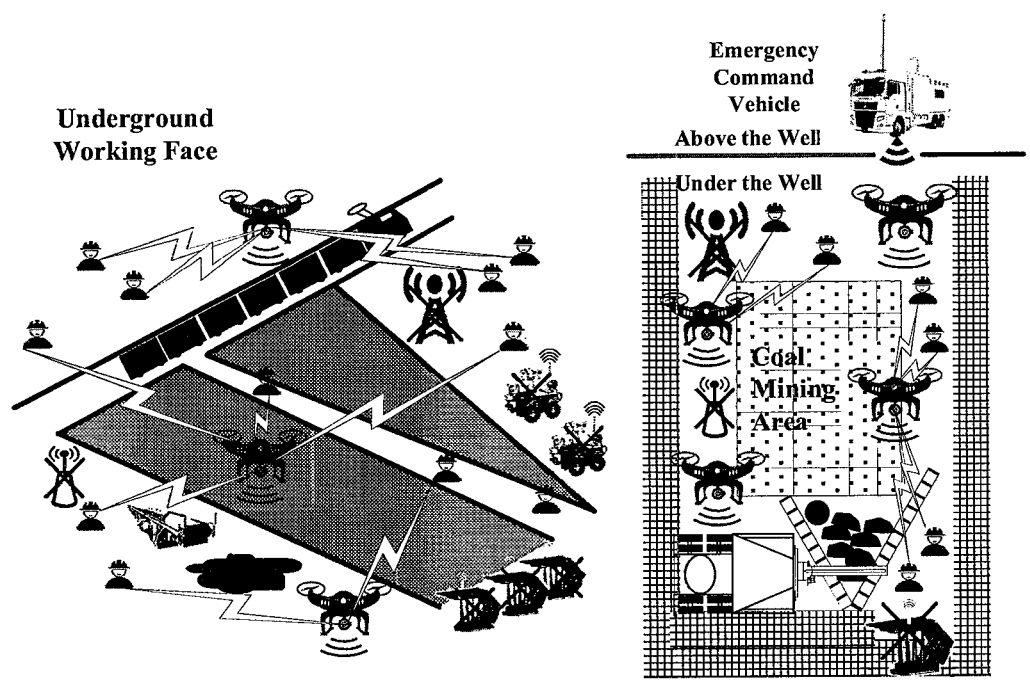
FIG. 1 is an emergency communication scene of underground space assisted by unmanned aerial vehicle (UAV) according to the present application.

In order to make the objective, technical scheme and advantages of the embodiment of the application clearer, the technical scheme in the embodiments of this application will be clearly and completely described below with reference to the drawings in the embodiments of this application. Obviously, the described embodiments are only a part of the embodiments of this application, but not all the embodiments. Generally, the components of the embodiments of the present application described and illustrated in the drawings herein may be arranged and designed in various different configurations. Therefore, the following detailed description of the embodiments of this application provided in the drawings is not intended to limit the scope of the claimed application, but only to represent selected embodiments of this application. Based on the embodiments of this application, all other embodiments obtained by the skilled person without creative labor fall into the scope of protection of this application.

As shown in FIGS. 1-5, the application provides a relay selection method for unmanned aerial vehicles in post disaster emergency scenarios in underground space, including the following steps:

collecting a maximum rate, a minimum rate and an average rate of data transmission assisted by a D2D user through an unmanned aerial vehicle (UAV) based on a prediction range of the D2D user for the UAV, and obtaining a first uncertain preference order of the D2D user for the UAV and a second uncertain preference order of the UAV for the D2D user;

obtaining a preference strategy of the D2D user for the UAV based on the first uncertain preference order and the second uncertain preference order, and constructing a many-to-one bilateral matching model according to a many-to-one bilateral matching algorithm;

exchanging and matching the UAVs matched by any two D2D users based on the many-to-one bilateral matching model, so as to obtain a stable matching result of bilateral exchange.

Further, in a process of obtaining the first uncertain preference order and the second uncertain preference order, a prediction range of the D2D user for the UAV in a target time slot is obtained by selecting the target time slot.

Further, in a process of obtaining the first uncertain preference order, the first uncertain preference order is constructed according to the maximum rate and the minimum rate, and a first preference expression of the first uncertain preference order is obtained, wherein the first preference expression is as follows:

$$H_{km} = (M - r_{km}^U) \sum_{i=r_{km}^L}^{r_{km}^U} \frac{1}{i \square |Y_{ki}|} \square \frac{1}{Z(U_m)} - \sum_{i=1}^{r_{km}^L - 1} \frac{1}{i \square |Y_{ki}|},$$

wherein $r_{km}^U$ is a lower limit of the first uncertain preference order, $r_{km}^L$ is an upper limit of the first uncertain preference order; for D2D pair k, $Y_{ki}$ is the set of individuals arranged in the ith place of the UAV set u; $|Y_{ki}|$ is the number of individuals in the set, and $Z(U_m)$ is a first interval length of the second uncertain preference order.

Further, in the process of obtaining the second uncertain preference order, the second uncertain preference order is constructed according to the maximum rate and the minimum rate, and a second preference expression of the second uncertain preference order is obtained; the preference expression is as follows:

$$H_{mk} = (K - r_{mk}^U) \sum_{j=r_{mk}^L}^{r_{mk}^U} \frac{1}{j \square |Y_{mj}|} \square \frac{1}{Z(k)} - \sum_{j=1}^{r_{mk}^L - 1} \frac{1}{j \square |Y_{mj}|}.$$

where $r_{mk}^U$ is a lower limit of the second uncertain preference order, $r_{mk}^L$ is an upper limit of the second uncertain preference order; for UAV $U_m$, $Y_{mj}$ is the set of individuals whose individual in K is ranked j; $|Y_{ki}|$ is the number of individuals in the set, and $Z(k)$ is a second interval length of the first uncertain preference order.

Further, obtaining the preference strategy and a preference list corresponding to the preference strategy according to the first preference expression and the second preference expression, and constructing the many-to-one bilateral matching model, where constraint conditions of the many-to-one bilateral matching model are as follows:

ω:K∪U→K∪U∪∅, where ∀k∈K,ω(k)⊆U∪∅,|ω(k)|≤1;

∀$U_m$∈U,ω($U_m$)⊆K∪∅,|ω($U_m$)|≤$q_0$;

∀k∈K,∀$U_m$∈U,ω(k)=$U_m$⇔ω($U_m$)=k.

The above expression is as follows: Matching ω is defined as the set mapped from set K∪U to K∪U∪∅. For any D2D user k belongs to D2D user set K, the matching object ω(k) of k belongs to UAV relay set U or empty set (indicating that k has no matching object), and k may only match one UAV relay at most; for any UAV relay $U_m$ belongs to UAV relay set U, the matching object ω($U_m$) of $U_m$ belongs to D2D user set K or empty set (indicating that $U_m$ has no matching object), and each UAV relay may serve $q_0$ D2D user pairs at most; any D2D user k belongs to D2D user set K, any UAV relay $U_m$ belongs to UAV relay set U, and the matching object ω(k) of k is $U_m$, which is equivalent to that the matching object ω($U_m$) of $U_m$ is k.

Further, in the process of constructing a many-to-one bilateral matching model, the matching process of the many-to-one bilateral matching model includes the following steps:

the D2D user calculates transmission performances by predicting a position of the relay UAV to obtain the first uncertain preference order, generates a corresponding preference list according to the first preference expression, and sorts and selects the relay UAV according to the preference list;

the relay UAV accepts a matching request of a best candidate according to the constraint condition after receiving the request of the D2D user, and rejects other D2D users;

the accepted D2D user stops the matching process, and the rejected D2D user sends a matching request to a suboptimal relay UAV until there is no better relay link than a current matching item, and the matching process is terminated.

Further, after the matching process is terminated, an exchange matching process includes the following steps:

S1, selecting a first D2D pair and a second D2D pair of the D2D user, and a first matching object of the first D2D pair and a second matching object of the second D2D pair;

S2, matching the first D2D pair with the second matching object, and simultaneously matching the second D2D pair with the first matching object; and S3, judging whether to execute an operation of the S2 according to the matching result of the S2, where the judging process includes:

when a transmission rate of the first D2D pair is increased and a transmission rate of the second D2D pair is unchanged, the matching process of the S2 is maintained;

when the transmission rate of the second D2D pair is increased and the transmission rate of the first D2D pair is unchanged, the matching process of the S2 is maintained;

when the transmission rate of the first D2D pair and the transmission rate of the second D2D pair are all increased, the matching process of the S2 is maintained;

otherwise, the matching process of S2 will not be executed.

Further, the constraint condition of the exchange matching is that when the first D2D pair and the second D2D pair meet following two conditions at the same time, an exchange restriction pair is formed, and the exchange matching process is executed:

$$\forall u \in \{k,k',\omega(k),\omega(k')\}, R_{avg}{}^k(\omega_k{}^{k'}) \geq R_{avg}{}^k(\omega) \quad \text{Condition 1:}$$

$$\exists u \in \{k,k',\omega(k),\omega(k')\}, R_{avg}{}^k(\omega_k{}^{k'}) \geq R_{avg}{}^k(\omega). \quad \text{Condition 2:}$$

Further, the steps of the exchange matching process include:

S1, in the initial stage, initializing the number of times that D2D pair k sends exchange requests to D2D pair k' that is, $C_{kk'}=0$;

S2, each of the D2D pairs k ∈ K searches another D2D pair k'∈ {K\k} to form an exchange restriction pair, and if (k,k') forms the exchange restriction pair and satisfies $C_{kk'}+C_{k'k} \leq 2$, the matching result is updated according to the many-to-one matching algorithm based on the uncertain preference order, and $C_{kk'}=C_{kk'}+1$; otherwise, the current matching state is maintained;

S3, when there is no exchange restriction pair in the current matching, returning an updated matching result.

Further, a UAV relay selection system for realizing a UAV relay selection method includes, a data acquisition and processing module is used to collect the maximum rate, minimum rate and average rate of the data transmission assisted by the D2D user through the UAV based on the prediction range of the D2D user for the UAV, and obtain the first uncertain preference order of the D2D user for the UAV and the second uncertain preference order of the UAV for the D2D user;

a preference matching module is used to obtain the preference strategy of the D2D user for the UAV based on the first uncertain preference order and the second uncertain preference order, and construct the many-to-one bilateral matching model according to the many-to-one bilateral matching algorithm; and an exchange matching module is used to exchange and match the matched UAVs of any two D2D users based on the matching result of the preference matching module, and obtain the stable matching result of bilateral exchange.

Embodiment 1

The following contents illustrate the specific implementation of the present application with reference to the drawings:

1. Overview of Scenarios and Problems

Figure 2:
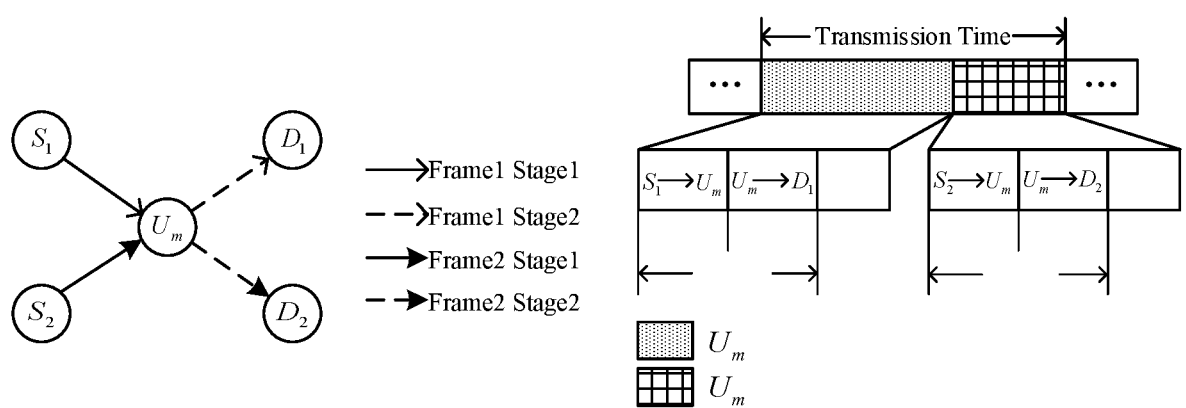
FIG. 2 shows the relay mode and transmission process of the UAV according to the present application.

FIG. 1 is a schematic diagram of unmanned aerial vehicle (UAV)-assisted underground space emergency communication scene taking a mine for example. In this scene, under the influence of mine accidents such as rock burst, gas explosion and coal fire, some or all underground fixed infrastructures (such as mine base stations) fail and it is difficult to restore communication services in a short time, and rescuers cannot quickly perceive the disaster situation in the disaster area and transmit emergency information, so UAV clusters need to quickly enter the disaster area to act as relay transmission nodes for ground users to assist rescuers in completing search and rescue tasks. Based on this, the invention adopts decoding and forwarding protocol for data transmission. When multiple D2D pairs choose the same UAV, the UAV uses time division multiple access technology to cooperate with these D2D pairs. D2D pairs has data to be transmit, data packets are transmitted frame by frame, and the length of each frame is equal. The frame is divided into two stages. The transmitter of 1D2D pair transmits data to the relay UAV in stage 1, and the relay UAV transmits data to the receiver of D2D pair in stage 2. The transmission model is shown in FIG. 2. It is assumed that the relay UAV cooperates with D2D pair-to-one and D2D pair-to-two transmission. Because the data size and transmission rate of D2D users are different, the relay UAV may allocate different time resources to different D2D pairs in the transmission time. In time slot, the data rate transmitted from the transmitter of D2D pair to the receiver by UAV is as follows:

$$R_k(U_m, t_n) = \frac{B}{q(U_m)} \log_2\left(1 + \min\{E_{S_k U_m}(t_n), E_{U_m D_k}(t_n) + E_{S_k D_k}(t_n)\}\right),$$

where B is the channel bandwidth, $E_{S_k U_m}(t_n)$ $E_{U_m D_k}(t_n)$ and $E_{S_k D_k}(t_n)$ are the signal-to-noise ratios of the transmitter $S_k$ of D2D to k to the UAV $U_m$, the receiver $D_k$ of $U_m$ to D2D to k and $S_k$ to $D_k$, respectively, and $q(U_m)$ represents the number of D2D pairs assisted by UAV $U_m$. The ratio of the data size and rate of D2D to k, that is, if the transmission time is less than the threshold $\tau_{th}$, the data of D2D to k may be successfully transmitted.

Because of the dynamic characteristics of the network, the data rate may be different in different time slots, so the number of D2D pairs successfully transmitted may be different. Therefore, the average total transmission success rate of D2D users may be maximized by optimizing the allocation of real-time relay UAVs, that is, the average ratio of the total number of D2D pairs successfully transmitted to the total number of D2D pairs in the whole network transmission phase may be expressed by the following formula:

$$\arg\max_{a_{mk}(t_n), b_{mk}(t_n)} \lim_{N \to \infty} \frac{1}{N} \Box \frac{1}{K} \sum_{n=1}^{N} \sum_{k=1}^{K} \sum_{m=1}^{M} a_{mk}(t_n) b_{mk}(t_n),$$

where s.t. $a_{mk}(t) = \begin{cases} 1, & f_k/R_k(U_m, t_n) \leq \tau_{th} \\ 0, & \text{others} \end{cases}$, $a_{mk}(t) = \begin{cases} 1, & \text{Select } UAV \ U_m \text{ as } k, \\ 0, & \text{others} \end{cases}$ To maximize the average total transmission success rate of D2D users, the following difficulties must be solved. Firstly, the optimization problem is NP-hard problem. Then, because the UAV flies dynamically and the position changes in real time, the optimal UAV relay allocation for D2D users changes with time. Finally, the flight trajectory of UAV is determined by the mission, which is unknown to the users on the ground, and the dynamic position of D2D users is also unknown to UAV. Therefore, the offline planning method is not advisable, and the online method is needed. In fact, the objective optimization problem is to maximize the number of successful transmissions of D2D users, and the selection of relay UAV not only affects the transmission of the current decision-making D2D pair, but also affects the transmission of other D2D pairs that reuse the same relay UAV. Therefore, the optimization problem will be changed to the optimization of relay UAV selection for solution.

2. Overview of Methods

In order to solve the problem of relay UAV selection for D2D pairs, the present application provides a many-to-one bilateral stable matching method under uncertain preference order, which is suitable for the uncertain scenes of matching strategy caused by the dynamic positions of UAVs and D2D users, and has good stability and effectiveness. The method consists of two steps: 1) D2D users and UAVs generate uncertain preference order according to uncertain information, and comprehensively evaluate the uncertain preference order to generate corresponding preference list, and establish a many-to-one bilateral matching model to obtain the matching result; 2) at this time, the matching result is unstable, and each exchange operation needs to be further iterated to eliminate the influence of peer effect to obtain a stable matching result.

2.1. Many-to-One Matching Based on Uncertain Preference Order

In the first stage, the application firstly proposes a layered strategy, a many-to-one bilateral matching model based on uncertain preference order. First of all, the flight trajectory of UAV is unknown to D2D users, and it is difficult for D2D users to directly generate a specific preference list based on uncertain information, so it is necessary to consider the situation that preference information is in order. In the $t_n$ time slot (III), the ground user has a prediction range $l(U_m, t_n)$ for the position of UAV $U_m$ in $t_{n-1}$ time slot. In the prediction range $l(U_m, t_n)$, the maximum rate, minimum rate and average rate of data transmitted by UAV $U_m$ from D2D to k are calculated, and they are expressed as $R_{max}^k(S_k, U_m, D_k)$, $R_{min}^k(S_k, U_m, D_k)$ and $R_{avg}^k(S_k, U_m, D_k)$ respectively. According to these rates, the uncertain preference order $\tilde{r}_{km} = \{r_{km}^L, r_{km}^L + 1, \ldots, r_{km}^U\}$ of individual k in K to individual $U_m$ in U is obtained. $r_{km}^L, r_{km}^L + 1, \ldots, r_{km}^U \in Z^+$, $r_{km}^L \leq r_{km}^U$, $r_{km}^L$ and $r_{mk}^U$ are the upper limit and lower limit of $\tilde{r}_{km}$ in order interval, which are determined by the ranking of $R_{max}^k(S_k, U_m, D_k)$ and $R_{min}^k(S_k, U_m, D_k)$ respectively. Especially, if $r_{km}^L = r_{km}^U$, $\tilde{r}_{km}$ degenerates into an accurate order value. The smaller the order value of uncertain preference order is, the higher the position of $U_m$ in the evaluation ranking of k is, that is, it better meets the needs of k. Similarly, the UAV calculates the maximum rate $R_{max}^m(S_k, U_m, D_k)$ the minimum rate $R_{min}^m(S_k, U_m, D_k)$ and the average rate $R_{avg}^m(S_k, U_m, D_k)$ of D2D pairs within the moving range $l(k, t_n)$, and according to these rates, the uncertain preference order $\tilde{r}_{mk} = \{r_{mk}^L, r_{mk}^L + 1, \ldots, r_{mk}^U\}$, $r_{mk}^L, r_{mk}^L + 1, \ldots, r_{mk}^U \in Z^+$, $r_{mk}^L \leq r_{mk}^U$ of individual $U_m$ in U to individual k in K is obtained, $r_{mk}^L$ and $r_{mk}^U$ are the upper and lower limits of the order interval $\tilde{r}_{mk}$, respectively, which are determined by the ranking of $R_{max}^m(S_k, U_m, D_k)$ and $R_{min}^m(S_k, U_m, D_k)$. In particular, if $r_{mk}^L = r_{mk}^U$, $\tilde{r}_{mk}$ degenerates into an accurate order value. The smaller the order value of uncertain preference order is, the higher the position of k in $U_m$'s evaluation ranking, and $U_m$ will give priority to providing relay transmission service. Based on this, the comprehensive score of individual k in D2D pair set K to individual $U_m$ in relay UAV set U and the comprehensive score of individual $U_m$ in U to individual k in K may be expressed by the following formulas:

$$H_{km} = (M - r_{km}^U) \sum_{i=r_{km}^L}^{r_{km}^U} \frac{1}{i \Box |Y_{ki}|} \Box \frac{1}{Z(U_m)} - \sum_{i=1}^{r_{km}^L - 1} \frac{1}{i \Box |Y_{ki}|},$$

$$H_{mk} = (K - r_{mk}^U) \sum_{j=r_{mk}^L}^{r_{mk}^U} \frac{1}{j \Box |Y_{mj}|} \Box \frac{1}{Z(k)} - \sum_{j=1}^{r_{mk}^L - 1} \frac{1}{j \Box |Y_{mj}|},$$

where $Y_{ki}$ is the set of individuals whose individual in U is ranked i for k, $Y_{mj}$ is the set of individuals whose individual in K is ranked j for $U_m$, and $|Y_{ki}|$ and $|Y_{mj}|$ represent the number of individuals in the set. $Z(U_m)$ and $Z(k)$ are the interval lengths of $U_m$ and k's uncertain preference order, respectively. Particularly, if $r_{mk}^L = 1$ and $r_{mk}^L = 1$, there is no need to subtract the corresponding scores. The comprehensive score obtained based on the participants' uncertain preference order not only considers the competition degree of the matched individuals in the same position, but also reflects the preference differences of different individuals, which reflects the real will of the subject to a great extent.

According to the comprehensive score, the preference strategy of D2D to k may be obtained: for the matching objects $U_m$ in the k preference list, 1) when $H_{km} > H_{km'}$, $U_m \succ_k U_{m'}$; 2) when $H_{km}=H_{km'}$, if $H_{km}=H_{km'}$, $U_m \succ_k U_{m'}$; if $R_{avg}{}^k(S_k,U_m,D_k)=R_{avg}{}^k(S_k,U_{m'},D_k)$, then $U_m=_k U_{m'}$. Similarly, the preference strategy of UAV $U_m$ may be obtained: for the matching objects k and k' in the preference list of UAV $U_m$, 1) when $H_{mk}>H_{mk'}$, $k \succ_{U_m} k'$; 2) when $H_{mk}=H_{mk'}$, if $R_{avg}{}^m(S_k,U_m,D_k)>R_{avg}{}^m(S_{k'},U_m,D_{k'})$, then $k \succ_{U_m} k'$; if $R_{avg}{}^m(S_k,U_m,D_k)=R_{avg}{}^m(S_{k'},U_m,D_{k'})$, then $k=_{U_m} k'$. Establish a many-to-one bilateral matching model based on the preference list: Given two different limited participation sets K and U, ω is defined as a many-to-one matching relationship, and one matching is a double mapping ω: K∪U→K∪U∪∅ that satisfies the following conditions:

$$\forall k \in K, \omega(k) \subseteq U \cup \varnothing, |\omega(k)| \leq 1; \quad 1)$$

$$\forall U_m \in U, \omega(U_m) \subseteq K \cup \varnothing, |\omega(U_m)| \leq q_0; \quad 2)$$

$$\forall k \in K, \forall U_m \in U, \omega(k)=U_m \Leftrightarrow \omega(U_m)=k. \quad 3)$$

Based on the above discussion, the idea of the many-to-one matching algorithm based on the uncertain preference order proposed by the present application is: in each time slot, the D2D user calculates the transmission performance by predicting the position of the relay UAV to obtain the uncertain preference order, and then comprehensively evaluates it to generate the corresponding preference list. D2D users sort and select relay UAVs according to the preference list. After receiving the request of D2D users, the UAV will accept the matching request of the best candidate and reject other D2D users when the quota constraint requirements are met. The accepted D2D user stops the matching process, while the rejected D2D user continues to send matching requests to the sub-optimal relay UAV. Until there is no better trunk link than the current match, the matching process is terminated. Many-to-one matching algorithms under uncertain preference order may be summarized as follows:

Step 1: the algorithm progress to time slot $t_n$. D2D comprehensively evaluate k∈K and relay UAV $U_m$∈U according to their uncertain preference order, and establish preference list.

Step 2: if ∃k∈K, |ω(k)|=0, and the preference list of k is not empty, perform the following steps for k∈K and $U_m$∈U respectively until all D2D pairs match the preference list or are rejected by the relay UAVs.

1: All D2D pairs send a request to the relay UVA $U_{m*}$ which is at the first place in their preference list, set $b_{m*k}$ to 1, and then remove $U_{m*}$ from the preference list of k.

2. For all relay UAV $U_m$∈U, if the number of requests of current D2D pairs is greater than $q_0(U_m)$, $U_m$ will accept $q_0(U_m)$ D2D pairs and reject other D2D pairs according to the preference list, and the $b_{m*k}$ value of rejected D2D pairs will be set to 0; if the number of requests of current D2D pair is less than or equal to $q_0(U_m)$, $U_m$ will accept all current requesters.

In the many-to-one matching algorithm based on uncertain preference order, the number of matching D2D pairs and UAVs is K and M, respectively. In the worst case, the candidate relay set of any D2D pair contains all UAVs, and all relay UAVs' preferences for D2D users may not meet the requirements of relay UAVs. In this case, the matching D2D users need to send requests to other relay UAVs continuously and are rejected, so the worst time complexity of the algorithm is O(MK), and the worst time complexity of the algorithm is O(NMK) in the whole task transmission cycle of the system.

2.2 Eliminate Relay UVA Selection in Peer Effect

The matching result of the many-to-one matching algorithm based on the above-mentioned uncertain preference order is unstable because of the existence of peer effect, that is, a D2D user may constantly change his preference order according to the preference list formed by other D2D users, so he will never reach the final relay selection result. Therefore, in the second stage, the present application introduces how to make any two D2D pairs exchange their matched relay UAVs through exchange operation, so as to avoid a peer effect and achieve a stable matching state.

The concept of matching is defined as:

$$\omega_k{}^{k'}=\omega \square \{(k,\omega(k)),(k',\omega(k'))\} \cup \{(k,\omega(k')),(k',\omega(k))\},$$

that is, while keeping the corresponding matching of other D2D pairs and unmanned aerial vehicles unchanged, D2D pairs k and k' exchange the matching objects. Particularly, during the exchange, the position of the D2D pair of one party allowed to participate is empty, so the single D2D pair moves to the available vacancy corresponding to the UAV.

On this basis, for D2D pair (k,k'), if and only if both $\forall u \in \{k,k',\omega(k),\omega(k')\}, R_{avg}{}^k(\omega_k{}^{k'}) \geq R_{avg}{}^k(\omega)$ and $\exists u \in \{k,k',\omega(k),\omega(k')\}, R_{avg}{}^k(\omega_k{}^{k'}) \geq R_{avg}{}^k(\omega)$ are satisfied, then (k,k') is called exchange restriction pair.

Based on the above definition, it can be known that exchange matching is performed between exchange restriction pairs. After the exchange, the transmission rate of all D2D pairs participating in the exchange will not decrease, but the transmission rate of at least one D2D pair will increase, which also avoids the cycle between equivalent matching. The exchange is based on the utility value, and the rate increase in the prediction range is used as the exchange condition to reflect the uncertainty in the transmission process. In bilateral matching, stability is usually used to measure the quality of the matching scheme. For many-to-one bilateral matching ω, if there is no exchange restriction pair, the matching ω is considered to be stable in bilateral exchange. In order to eliminate the exchange restriction pair in matching ω, the present application iteratively completes each exchange operation based on the exchange restriction pair of the matching result $\omega(t_n)$ under the many-to-one matching algorithm under the uncertain preference order. Therefore, the method may dynamically obtain the stable matching result of bilateral exchange. The relay UAV selection method for avoiding peer effect provided by the application may be summarized as follows:

Step 1: in the initial stage, initialize the number of times that D2D pair k sends exchange requests to k' that is, $C_{kk'}$=0.

Step 2, each D2D pair k∈K searches another D2D pair k'∈{K\k} to form an exchange restriction pair, and if (k,k') forms an exchange restriction pair and satisfies $C_{kk'}+C_{k'k} \leq 2$, the matching result is updated according to the many-to-one matching algorithm based on the uncertain preference order, and $C_{kk'}=C_{kk'}+1$; otherwise, the current matching state is maintained.

Step 3: when there is no exchange restriction pair in the current match, returning the updated matching result $\omega(t_n)$.

$C_{kk'}$ is expressed as the number of times that D2D pair k sends exchange requests to k', and k may exchange with k' at most twice, which avoids the ping-pong effect and ensures the convergence of the algorithm. When there is no exchange restriction pair in the current matching, the exchange matching process ends and the matching result $\omega(t_n)$ is updated. Compared with the algorithm in the first stage, the method proposed in the second stage has more steps of exchange matching, and the upper limit of exchange times is $C_K{}^2$. Therefore, the worst time complexity of the relay UAV selection method to avoid peer effect in the whole mission transmission cycle of the system is $O(N(MK+C_K{}^2))$ The matching ω finally obtained by the method provided by the application is stable in bilateral exchange.

It is proved that if the final matching result ω is not stable in bilateral exchange, there is at least one exchange restriction pair (k,k'), but the relay selection algorithm for stable matching in bilateral exchange will not be terminated when there are exchange restriction pairs. Therefore, the matching result ω is not the final result and conflicts with the assumed conditions. Therefore, the matching obtained by the proposed algorithm is stable in bilateral exchange.

Embodiment 2

A specific embodiment of the present application is described as follows: Matlab2015a is adopted for system simulation, and parameter setting does not affect the generality of the present application. The D2D pairs are randomly distributed in the 3 km×3 km area, the distance between the transmitter and the corresponding receiver is randomly within (100 m, 200 m), and the transmitter and the receiver users randomly move within (1 m, 2 m) each time slot. The UAV randomly chooses the flight direction, and does not fly out of the specified area. The flight altitude is [100 m, 200 m], the flight speed is 10 m/s, and the battery capacity is 2×10$^5$ J. The energy consumption model of UAV refers to the energy consumption model of multi-rotor UAV (reference: Wang B, Sun Y, Liu D, et al. Social-aware UAV-assisted Mobile Crowd Sensing in Stochastic and Dynamic Environments for Disaster Relief Networks. IEEE Transactions on Vehicular Technology, 2020, 69(1):1070-1074). Comparison algorithms of the application are exhaustive search algorithm (the optimal solution may be obtain but the time complexity is extremely high), random relay selection algorithm (the time complexity is low but the performance is unstable) and one-to-one matching algorithm (references: Liu D, Yang Y, Xu Y, et al. Uncertain Preference Matching-Based Relay Selection and Position Adjustment in Dynamic UAV Systems/2020 International Conference on Wireless Communications and Signal Processing (WCSP), 2020: 1170-1175).

Figure 3:
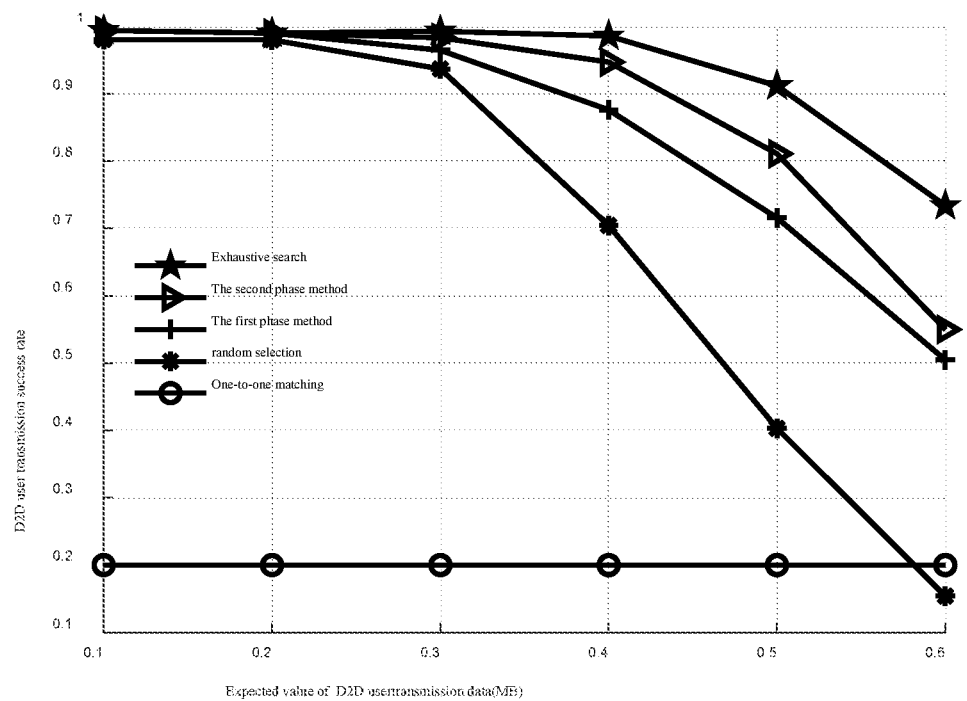
FIG. 3 shows the relationship between the transmission success rate of D2D users and the change of expected value of the transmission data.
Figure 4:
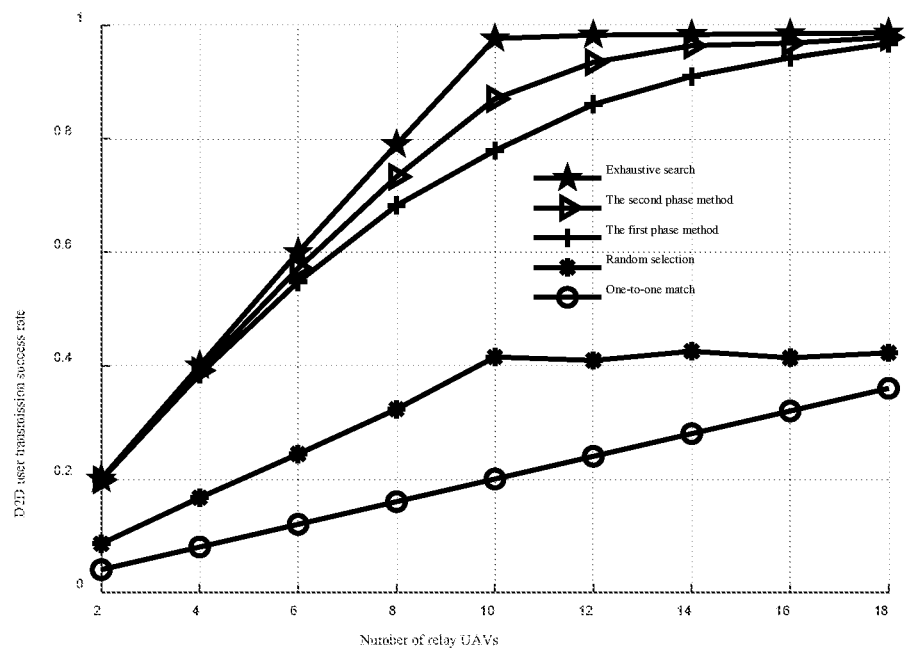
FIG. 4 shows the relationship between the transmission success rate of D2D users and the change of the number of relay UAVs.
Figure 5:
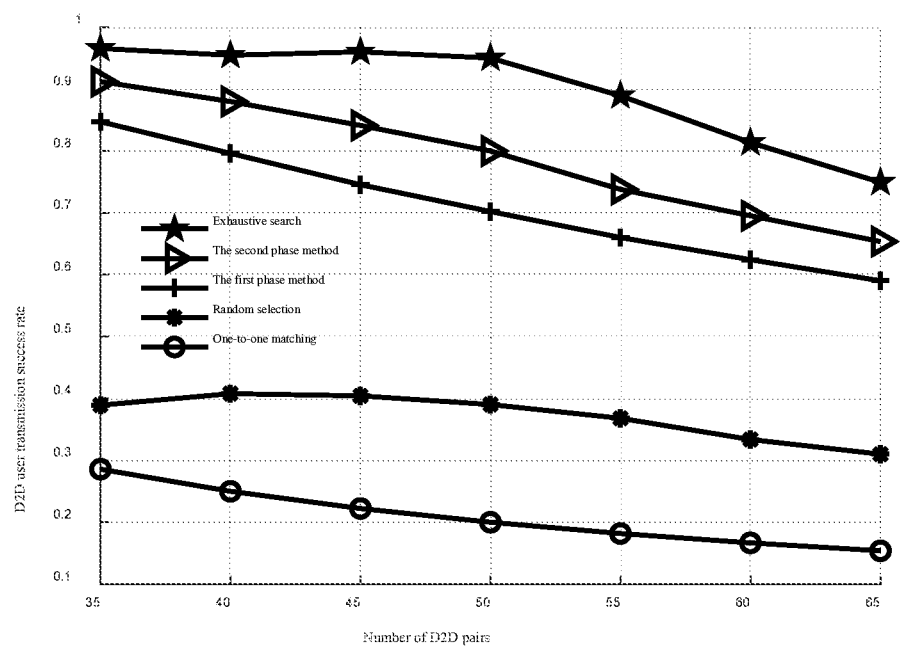
FIG. 5 shows the relationship between the transmission success rate of D2D users and the change of the number of D2D pairs.

Simulation analysis: FIG. 3, FIG. 4 and FIG. 5 respectively show the comparison between the proposed method (many-to-one matching algorithm based on uncertain preference order and relay UAV selection method to avoid peer effect) and the existing method in the transmission success rate of D2D users under three conditions: the expected value of D2D users' transmission data, the number of relay UAVs and the number of D2D pairs. It can be seen from these three figures that the transmission success rate of D2D users obtained by the proposed algorithm is lower than that of the exhaustive algorithm, and the result is suboptimal, but the computational complexity of the proposed algorithm is greatly reduced compared with that of the exhaustive algorithm. In addition, the proposed method allows the same relay UAV to cooperate with many pairs of D2D users to communicate in the same time slot, and the matching result is stable, which may ensure the timely and effective communication of as many rescuers as possible. Therefore, the performance of the proposed algorithm is better than other comparison methods, and it is more suitable for emergency dynamic distributed scenarios.

What is claimed is:

1. A relay selection method for unmanned aerial vehicles in post disaster emergency scenarios in underground space, comprising following steps:

collecting a maximum rate, a minimum rate and an average rate of data transmission assisted by a D2D user through an unmanned aerial vehicle (UAV) based on a prediction range of the D2D user for the UAV, and obtaining a first uncertain preference order of the D2D user for the UAV and a second uncertain preference order of the UAV for the D2D user;

obtaining a preference strategy of the D2D user for the UAV based on the first uncertain preference order and the second uncertain preference order, and constructing a many-to-one bilateral matching model according to a many-to-one bilateral matching algorithm; and exchanging and matching the UAVs matched by any two D2D users based on the many-to-one bilateral matching model, and obtaining a stable matching result of bilateral exchange.

2. The relay selection method for unmanned aerial vehicles in post disaster emergency scenarios in underground space according to claim 1, wherein:

a prediction range of the D2D user for the UAV in a target time slot is obtained by selecting the target time slot in a process of obtaining the first uncertain preference order and the second uncertain preference order.

3. The relay selection method for unmanned aerial vehicles in post disaster emergency scenarios in underground space according to claim 1, wherein:

in a process of obtaining the first uncertain preference order, the first uncertain preference order is constructed according to the maximum rate and the minimum rate, and a first preference expression of the first uncertain preference order is obtained, wherein and a first preference formula is:

$$H_{km} = (M - r_{km}^U) \sum_{i=r_{km}^L}^{r_{km}^U} \frac{1}{i \square |Y_{ki}|} \square \frac{1}{Z(U_m)} - \sum_{i=1}^{r_{km}^L - 1} \frac{1}{i \square |Y_{ki}|},$$

wherein $r_{mk}^U$ is a lower limit of the first uncertain preference order, $r_{km}^L$ is an upper limit of the first uncertain preference order; $Y_{ki}$ is the set of individuals in the i$^{th}$ place of a UAV set U arranged by a D2D pair; $|Y_{ki}|$ is the number of individuals in the set, and $Z(U_m)$ is a first interval length of the second uncertain preference order.

4. The relay selection method for unmanned aerial vehicles in post disaster emergency scenarios in underground space according to claim 3, wherein:

in the process of obtaining the second uncertain preference order, the second uncertain preference order is constructed according to the maximum rate and the minimum rate, and a second preference expression of the second uncertain preference order is obtained; and a preference formula is as follows:

$$H_{mk} = (K - r_{mk}^U) \sum_{j=r_{mk}^L}^{r_{mk}^U} \frac{1}{j \square |Y_{mj}|} \square \frac{1}{Z(k)} - \sum_{j=1}^{r_{mk}^L - 1} \frac{1}{j \square |Y_{mj}|},$$

wherein $r_{mk}^U$ is a lower limit of the second uncertain preference order, $r_{mk}^L$ is an upper limit of the second uncertain preference order; for UAV $U_m$, $Y_{mj}$ is the set of individuals whose individual in K is ranked j; $Y_{ki}$ is the set of individuals in the j$^{th}$ place of the D2D pair set K arranged by UAV $U_m$; $|Y_{ki}|$ is the number of individuals in the set, and Z(k) is a second interval length of the first uncertain preference order.

5. The relay selection method for unmanned aerial vehicles in post disaster emergency scenarios in underground space according to claim 4, wherein:
obtaining the preference strategy and a preference list corresponding to the preference strategy according to the first preference expression and the second preference expression, and constructing the many-to-one bilateral matching model, wherein constraint conditions of the many-to-one bilateral matching model are as follows:

$\omega: K \cup U \to K \cup U \cup \emptyset,$ wherein $\forall k \in K, \omega(k) \subseteq U \cup \emptyset, |\omega(k)| \leq 1;$ $\forall U_m \in U, \omega(U_m) \subseteq K \cup \emptyset, |\omega(U_m)| \leq q_0;$ $\forall k \in K, \forall U_m \in U, \omega(k) = U_m \Leftrightarrow \omega(U_m) = k,$ and ω means matching.

6. The relay selection method for unmanned aerial vehicles in post disaster emergency scenarios in underground space according to claim 5, wherein:
a matching process of the many-to-one bilateral matching model comprises following steps in a process of constructing a many-to-one bilateral matching model:
the D2D user calculates transmission performances by predicting a position of the relay UAV to obtain the first uncertain preference order, generates a corresponding preference list according to the first preference expression, and sorts and selects the relay UAV according to the preference list;
the relay UAV accepts a matching request of a best candidate according to a constraint condition after receiving the request of the D2D user, and rejects other D2D users; and
the accepted D2D user stops the matching process, and the rejected D2D user sends a matching request to a suboptimal relay UAV until there is no better relay link than a current matching item, and the matching process is terminated.

7. The relay selection method for unmanned aerial vehicles in post disaster emergency scenarios in underground space according to claim 6, wherein:
after the matching process is terminated, an exchange matching process comprises following steps:
S1, selecting a first D2D pair and a second D2D pair of the D2D user, and a first matching object of the first D2D pair and a second matching object of the second D2D pair;
S2, matching the first D2D pair with the second matching object, and simultaneously matching the second D2D pair with the first matching object; and
S3, judging whether to execute an operation of the S2 according to the matching result of the S2, wherein a judging process comprises:
when a transmission rate of the first D2D pair is increased and a transmission rate of the second D2D pair is unchanged, the matching process of the S2 is maintained;
when the transmission rate of the second D2D pair is increased and the transmission rate of the first D2D pair is unchanged, the matching process of the S2 is maintained;
when the transmission rate of the first D2D pair and the transmission rate of the second D2D pair are all increased, the matching process of the S2 is maintained;
otherwise, the matching process of S2 will not be executed.

8. The relay selection method for unmanned aerial vehicles in post disaster emergency scenarios in underground space according to claim 7, wherein:
the constraint condition of the exchange matching means when the first D2D pair and the second D2D pair meet following two conditions at a same time, an exchange restriction pair is formed, and an exchange matching process is executed:

condition 1: $\forall u \in \{k, k', \omega(k), \omega(k')\}, R_{avg}^{k}(\omega_k^{k'}) \geq R_{avg}^{k}(\omega)$ condition 2: $\exists u \in \{k, k', \omega(k), \omega(k')\}, R_{avg}^{k}(\omega_k^{k'}) \geq R_{avg}^{k}(\omega).$ 9. The relay selection method for unmanned aerial vehicles in post disaster emergency scenarios in underground space according to claim 8, wherein:
steps of the exchange matching process comprise:
S1, initializing a number of times $C_{kk'}=0$ for D2D pair k to send exchange requests to D2D pair k', in an initial stage;
S2, searching another D2D pair k'∈{K\k} by each of the D2D pairs k∈K to form an exchange restriction pair, wherein if (k,k') forms the exchange restriction pair and satisfies $C_{kk'}+C_{k'k} \leq 2$ the matching result is updated according to the many-to-one matching algorithm based on the uncertain preference order, and $C_{kk'}=C_{kk'}+1$; otherwise, the current matching state is maintained; and
S3, returning an updated matching result when there is no exchange restriction pair in the current matching.

10. The relay selection method for unmanned aerial vehicles in post disaster emergency scenarios in underground space according to claim 8, wherein a UAV relay selection system for realizing a UAV relay selection method comprises:
a data acquisition and processing module used to collect the maximum rate, the minimum rate and the average rate of the data transmission assisted by the D2D user through the UAV based on the prediction range of the D2D user for the UAV, and obtain the first uncertain preference order of the D2D user for the UAV and the second uncertain preference order of the UAV for the D2D user;
a preference matching module used to obtain the preference strategy of the D2D user for the UAV based on the first uncertain preference order and the second uncertain preference order, and construct the many-to-one bilateral matching model according to the many-to-one bilateral matching algorithm; and
an exchange matching module used to exchange and match the matched UAVs of any two D2D users based on the matching result of the preference matching module, and obtain the stable matching result of bilateral exchange.

* * * * *